United States Patent
Nielsen et al.

(10) Patent No.: US 8,226,995 B2
(45) Date of Patent: Jul. 24, 2012

(54) METHOD FOR PRODUCING FRACTIONS OF A MILK COMPOSITION

(75) Inventors: Per Munk Nielsen, Birkeroed (DK); Hanna Lilbaek, Copenhagen (DK)

(73) Assignee: Novozymes A/S, Bagsvaerd (DK)

( * ) Notice: Subject to any disclaimer, the term of this patent is extended or adjusted under 35 U.S.C. 154(b) by 931 days.

(21) Appl. No.: 11/720,651

(22) PCT Filed: Dec. 21, 2005

(86) PCT No.: PCT/DK2005/000810
§ 371 (c)(1),
(2), (4) Date: Jun. 1, 2007

(87) PCT Pub. No.: WO2006/066590
PCT Pub. Date: Jun. 29, 2006

(65) Prior Publication Data
US 2009/0285934 A1    Nov. 19, 2009

Related U.S. Application Data

(60) Provisional application No. 60/638,279, filed on Dec. 21, 2004, provisional application No. 60/645,780, filed on Jan. 21, 2005.

(30) Foreign Application Priority Data

Dec. 21, 2004 (DK) .................. 2004 01972
Jan. 20, 2005 (DK) .................. 2005 00102

(51) Int. Cl.
*A23C 9/12* (2006.01)
(52) U.S. Cl. ............... 426/35; 426/34; 426/580
(58) Field of Classification Search .............. 426/34, 426/35, 36, 42, 580, 581, 582, 583, 586, 426/587, 588
See application file for complete search history.

(56) References Cited

FOREIGN PATENT DOCUMENTS

| | | |
|---|---|---|
| DK | PA 2004 01972 | 12/2004 |
| DK | PA 2005 00102 | 1/2005 |
| EP | 1 127 494 A | 8/2001 |
| GB | 2 021 140 A | 11/1979 |
| WO | WO 00/54601 | 9/2000 |
| WO | WO 00/54602 | 9/2000 |
| WO | WO 02/069725 | 9/2002 |
| WO | WO 02/091851 | 11/2002 |
| WO | 2003/071875 A1 | 9/2003 |

OTHER PUBLICATIONS

Yakuit Honsha KK, JP57189637 (Nov. 22, 1982).
Yakuit Honsha KK, JP57189638 (Nov. 22, 1982).
Paramalingam et al. "On the fouling of falling film evaporations due to film break-up" Food and Bioproducts Processing, 78:79-84 (2000).
O. Santos et al. "Whey protein adsorption and aggregation on modified stainless steel surfaces in relation to fouling" Doctoral Thesis Lund University, Sweden (2004).
Written Opinion for PCT/DK2005/000610 (2006).
Bylund, Dairy Process Handbook, chapter 6.2, pp. 104-109 (1995).
McCrae et al., Encyclopaedia of Food Science Food Technology and Nutrition, vol. 2, pp. 1264-1265 (1993).
Mulder et al., The Milk Fat Globule Emulsion Science as Applied to Milk Products and Comparable Foods, pp. 26-27 (1974).
Nalbone et al., Journal of Lipid Research, vol. 24, pp. 1441-1450 (1983).
Wikipedia, Rennet, Production of Natural Calf Rennet, pp. 1-4 (2011).

*Primary Examiner* — Leslie Wong
(74) *Attorney, Agent, or Firm* — Kristin J. McNamara

(57) ABSTRACT

The invention relates to a method for producing fractions of a milk composition by treating a milk composition with a phospholipase and separating it into at least two fractions with different fat content. The fractions obtained have improved properties for producing food products. The invention further relates to a method for producing food products from one or more of the fractions obtained. In further aspects the invention relates to methods for producing condensed milk, milk powder, butter and dairy spread from a milk composition treated with a phospholipase.

6 Claims, No Drawings

METHOD FOR PRODUCING FRACTIONS OF A MILK COMPOSITION

CROSS-REFERENCE TO RELATED APPLICATIONS

This application is a 35 U.S.C. 371 national application of PCT/DK2005/000810 filed Dec. 21, 2005 which claims priority or the benefit under 35 U.S.C. 119 of Danish application Nos. PA 2004 01972 filed Dec. 21, 2004 and PA 2005 00102 filed Jan. 20, 2005 and U.S. provisional application Nos. 60/638,279 filed Dec. 21, 2004 and 60/645,780 filed Jan. 21, 2005, the contents of which are fully incorporated herein by reference.

TECHNICAL FIELD

The present invention relates to a method for producing fractions of a milk composition treated with phospholipase and to a method for producing a food product from one or more of the fractions, as well as food products obtainable by the method. Furthermore the invention relates to methods for producing condensed milk, milk powder, butter and dairy spread.

BACKGROUND OF THE INVENTION

When milk is processed into dairy or other food products there are a number of properties of the milk that are desirous, depending on the product to be produced, e.g. low tendency to produce fouling of equipment, good emulsification properties and high heat stability. Specifically, for production of butter a high yield of butter from the cream is desirous, and when producing liquid acidified milk drinks, a low viscosity may be desired.

Milk used for production of dairy products is very often heat treated, e.g. by pasteurisation. A well-known problem when heat treating milk is fouling of the heating surfaces, i.e. that milk solids are deposited on the surfaces decreasing the heat transfer rate. This problem is known e.g. with plate heat exchangers and in evaporators. Fouling is also an important problem in relation to a number of other dairy processes, e.g. membrane filtration. Fouling is related to the wetting of the, usually hydrophilic, surfaces of processing equipment, and the wetting properties are largely determined by surface tension. According to Paramalingam et al.: On the fouling of falling film evaporators due to film break-up (2000), Food and Bioproducts Processing, 78, pp. 79-84, surface tension is an important factor in fouling of falling film evaporators. Furthermore, it has been shown that the higher the contact angle, the less material is deposited on heating surfaces during heat treatment of milk (O. Santos et al. (2004): Effect of surface and bulk solution properties on the adsorption of whey protein onto steel surfaces at high temperature. In: Santos, O.: Whey protein adsorption and aggregation on modified stainless steel surfaces in relation to fouling, Doctoral thesis, Lund University, Lund, Sweden). The contact angle is increased when the surface tension of milk is decreased. Fouling decreases efficiency of processing equipment and increases the need for cleaning of the equipment, leading to lost production time. There is a desire to decrease the rate of fouling of dairy process equipment. Fouling is often caused by deposition of milk proteins, e.g. beta-lactoglobulin, on solid surfaces, and may be reduced by replacing milk proteins with other substances at the liquid/solid interface.

Milk comprises phospholipids. The phospholipids are associated with the milk fat due to its non-polar, lipophilic properties. Phospholipids may be hydrolysed by phospholipase into lysophospholipid, which may in turn be hydrolysed by a lysophospholipase (phospholipase type B). WO 00/54601 (Novozymes A/S) discloses a method for producing cheese, comprising treating the cheese milk with a phospholipase.

SUMMARY OF THE INVENTION

The inventors have found that when treating a milk composition with a phospholipase, and separating the milk composition into two or more fractions with different fat content, it is possible to produce fractions with novel and advantageous properties for the production of food products, e.g. fractions with reduced surface tension, fractions that lead to increased yield of butter upon churning, and/or fractions that lead to improved properties of milk powder products produced there from.

Consequently, the invention relates to a method for producing fractions of a milk composition, comprising: i) treating a milk composition with a phospholipase; and ii) separating the treated milk composition into at least two fractions with different fat content. In further aspects the invention relates to the fractions of a milk composition obtainable by the method of the invention, methods for producing food products, and food products obtainable by using methods of the invention. In a further aspect the invention relates to methods for producing condensed milk, milk powder, butter and dairy spread, and condensed milk, milk powder, butter and dairy spread obtainable by the method.

DETAILED DISCLOSURE OF THE INVENTION

Milk Composition

Milk may be the lacteal secretion of any mammal, e.g., cow, sheep, goat, buffalo or camel. A milk composition according to the invention may be any liquid composition comprising milk fat. A milk composition may comprise one or more milk fractions. In one embodiment of the invention a milk composition is a milk fraction. A milk fraction may be any fraction of milk such as e.g. skim milk, butter milk, whey, cream, milk powder, whole milk powder, skim milk powder. In another embodiment of the invention the milk composition comprises milk, skim milk, butter milk, whole milk, whey, cream, or any combination thereof. In a further embodiment the milk composition consists of milk. The content of milk fat in the milk composition may be controlled to achieve the desired effect, e.g. the desired amount of milk fat and phospholipase hydrolysis products in the fractions obtained when subjecting the milk composition to the method of the invention.

In further embodiments of the invention, the milk composition is prepared, totally or in part, from dried milk fractions, such as, e.g., whole milk powder, skim milk powder, casein, caseinate, total milk protein, butter, anhydrous milk fat, or buttermilk powder, or any combination thereof.

The milk composition may be standardised to the desired composition by removal of all or a portion of any of the milk components and/or by adding thereto additional amounts of such components. This may be done e.g. by separation of milk into cream and skim milk at arrival to the dairy. Thus, the milk composition may be prepared as done conventionally by fractionating milk and recombining the fractions so as to obtain the desired final composition of the milk composition. The separation may be made in continuous centrifuges leading to a skim milk fraction with very low fat content (i.e. e.g. <0.5%) and cream with e.g. >35% fat. The milk composition may be prepared by mixing cream and skim milk in appropriate amounts to achieve the desired fat content. In another embodiment the protein and/or casein content is standardised by the use of Ultra Filtration.

In one embodiment of the invention the milk composition is raw milk, i.e. milk which has not been subjected to a separation process or to a heat treatment. In another embodiment the milk composition is milk that have been heat treated, e.g. by pasteurisation or thermalisation.

The Enzymatic Treatment:

The enzymatic treatment in the process of the invention may be conducted by dispersing the phospholipase into the milk composition and allowing the enzyme reaction to take place at an appropriate holding-time at an appropriate temperature. The treatment with phospholipase may be carried out at conditions chosen to suit the selected phospholipase according to principles well known in the art. The treatment may also be conducted by contacting the milk composition with phospholipase that has been immobilised.

The phospholipase treatment may be conducted at any suitable pH, such as e.g., in the range 2-10, such as, at a pH of 4-9 or 5-7. It may be preferred to let the phospholipase act at the natural pH of the milk composition.

The phospholipase treatment may be conducted at any appropriate temperature, e.g. in the range 1-70° C., such as 2-60° C. The phospholipase treatment may be conducted at a low temperature, e.g. in the storage tank at the farmer or at the dairy, e.g. at a temperature of 2-7° C.

In one embodiment of the invention phospholipase is added to milk at the farm, and the phospholipase is allowed to react in the milk at low temperature during storage at the farm, and/or during transportation to the dairy plant, and optionally during storage at the dairy plant. In another embodiment phospholipase is added to the milk at reception at the dairy plant and allowed to react in the milk during storage at the dairy plant.

In another embodiment of the invention the phospholipase is allowed to react in the milk composition at the temperature of separation. If the milk is separated in a conventional continuous centrifuge the separation temperature will usually be in the range 40-70° C.

Optionally, after the phospholipase has been allowed to act on the milk composition, the phospholipase enzyme protein may be removed, reduced, and/or inactivated.

The phospholipase is added in a suitable amount to achieve the desired degree of hydrolysis under the chosen reaction conditions. A suitable dosage of a phospholipase A may e.g. be in the range 0.003-0.3 mg enzyme protein per g milk fat, preferably 0.01-0.3 mg enzyme protein per g milk fat, more preferably, 0.03 mg enzyme protein per g milk fat. A suitable dosage of a phospholipase B may e.g. be in the range 0.005-0.5 mg enzyme protein per g milk fat, preferably 0.01-0.5 mg enzyme protein per g milk fat, more preferably 0.05 mg enzyme protein per g milk fat.

In cow milk, the lecithin constitutes normally more than 95% of the phospholipids in milk whereas the lysolecithin is approximately 1% of the phospholipids. The amount of phosphatidyl choline (PC) and phosphatidyl ethanolamine (PE) is approximately 40% of the lecithin. In one embodiment of the invention, the lecithin content of the milk composition is reduced by at least 5%, such as at least 10%, at least 15%, at least 20%, or at least 25%, as a result of the phospholipase treatment. In another embodiment the amount of phosphatidyl choline and/or phosphatidyl ethanolamine in the milk composition is reduced by at least 20%, such as at least 40%, at least 60%, or at least 70% as a result of the phospholipase treatment.

Separation into at Least Two Fractions

According to the present invention a milk composition is separated into at least two fractions with different fat content. The separation may be performed by any method known in the art for separating milk compositions. In one embodiment milk is separated by centrifugation, e.g. in a conventional continuous centrifuge. In another embodiment milk is separated by filtration, e.g. by micro- or ultrafiltration. In all embodiments the properties of the separation technique and equipment must be such that the ratio between milk fat and phospholipid hydrolysis products in at least two of the fractions produced is different from the ratio in the phospholipase treated milk composition before separation. In one embodiment of the invention milk is separated into two fractions, e.g. into cream and skim milk. The fat content of skim milk will usually be below 0.6% (weight/weight) such as below 0.2%, the fat content of cream will usually be in the range 30-45% (weight/weight), such as in the range 35-40%. In one embodiment of the invention the fat content of one of the fractions obtained is at least the double of the fat content of another fraction.

In one embodiment of the invention a milk composition treated with a phospholipase is separated into at least two liquid fractions in step ii) of the method of the invention. A liquid milk composition or milk fraction is a milk composition or milk fraction that flows freely under the processing conditions used for the separation into milk fractions, i.e. a milk composition or milk fraction wherein substantially all of the milk casein is in a dispersed un-coagulated state. Examples of liquid milk compositions/milk fractions are milk, skim milk, cream, and permeate and retentate from ultra- and microfiltration, as opposed to e.g. cheese and rennet coagulated milk which are non-liquid.

In one embodiment the invention relates to fractions obtainable by the method of the invention. In a further embodiment the invention relates to fractions obtainable by the invention having a different fat content than the original milk composition that is treated with phospholipase in step i).

Properties of Fractions

The surface tension of the fractions may be affected by the method of the invention. In one embodiment of the invention the surface tension of at least one of the fractions is reduced compared to a similar fraction produced from a milk composition that has not been treated with phospholipase. In another embodiment the surface tension of at least one fraction is reduced or increased compared to a similar fraction produced from a milk composition that has not been treated with a phospholipase, but which fraction has been treated with phospholipase after the separation step. In a further embodiment the content of phospholipid hydrolysis products is higher or lower than in a similar fraction produced from a milk composition that has not been treated with a phospholipase, but which fraction has been treated with phospholipase after the separation step. In a still further embodiment the content of lysolecithin is higher or lower than in a similar fraction produced from a milk composition that has not been treated with a phospholipase, but which fraction has been treated with a phospholipase after the separation step.

The method of the invention affects the properties of at least one of the fractions obtained compared to a similar fraction from milk that has not been treated with a phospholipase. In one embodiment of the invention the properties of at least one of the fractions obtained are different from the properties of a similar fraction produced from a milk composition that has not been treated with a phospholipase, but which fraction has been treated with phospholipase after the separation step. The property affected may e.g. be the fouling observed when the fraction is subjected to a heat treatment, e,g, pasteurisation in a plate heat exchanger or Ultra High Temperature (UHT) treatment by steam injection; evaporation, e.g. in a falling film evaporator; or a membrane separation process, e.g. ultrafiltration or microfiltration. The method of the invention may reduce the degree of fouling observed with at least one of the fractions produced. The degree of fouling may be determined as the amount of solid material absorbed e.g. to the plates of a plate heat exchanger, to the walls of a falling film evaporator, or to the membrane of a membrane filtration unit. Fouling of surfaces may be observed in an experimental setup by ellipsometry, e.g. as described in O. Santos et al. (2004): Effect of surface and bulk solution properties on the adsorption of whey protein onto steel surfaces at high temperature. In: Santos, O.: Whey protein adsorption and aggregation on modified stainless steel surfaces in relation to fouling, Doctoral thesis, Lund University, Lund, Sweden.

The method of the invention may also affect the churnability of at least one of the fractions obtained, e.g. cream obtained by the method of the invention may need less time and/or less vigorous mechanical treatment to form butter and/or the yield of butter obtained may be higher, compared to cream obtained from a milk composition that has not been treated with a phospholipase, or cream that has been treated with a phospholipase without subsequent separation. Likewise, the emulsification properties may be improved, e.g. the emulsion stability or emulsion capacity. Additionally, the heat stability of one or more of the fractions may be improved, e.g. the temperature and/or time needed to induce flocculation or coagulation may be increased. Properties of food products produced from one or more of the fractions obtained by the method of the invention may be affected compared to properties of food products produced from a similar fraction produced from a milk composition that has not been treated with a phospholipase, but which fraction has been treated with phospholipase after the separation step. E.g. the appearance and texture, e.g. viscosity, of acidified dairy products; emulsification properties of milk; and the solubility and wettability of milk powders produced from the milk; may all be affected.

Food Product

In one embodiment the invention relates to a method for producing a food product from one or more fractions obtained by the method of the invention. A food product according to the invention may be any food product wherein milk or one or more milk fractions may be used as an ingredient, e.g. a meat product, a fish product, bread, cake, cookies, biscuits, confectionary products such as e.g. chocolate, dressings, sauces, and condiments. A food product may be produced by any method known in the art, and milk fractions obtained by the method of the invention may be used in the same way as conventional milk or milk fractions are normally used in production of food products. The milk fraction or fractions to be used in the production of a food product may be subjected to any processing known in the art to be useful in the production of a food product. One or more milk fractions may e.g. be heat treated, e.g. in a plate heat exchanger or in an evaporator or subjected to ultra- or microfiltration.

In one embodiment of the invention a food product is a dairy product. One or more milk fractions obtained by the method of the invention may be used for production of any dairy product, such as e.g. milk, e.g. skim milk, partly skimmed milk, or cream, for direct consumption; acidified milk, e.g. yoghurt; ice cream; milk powder, e.g. skim milk powder, whole milk powder, or butter milk powder; butter; ghee; anhydrous milk fat; buttermilk; condensed milk; sweetened condensed milk; dulche de leche; coffee whitener; coffee creamer; or cheese. Cheese may be any kind of cheese, e.g. fresh cheese, hard cheese, cream cheese, white mould cheese, blue mould cheese, process cheese, or pasta filata type cheese. A dairy product according to the invention may also be a recombined dairy product produced from dried milk components and optionally anhydrous milk fat, e.g. liquid whole milk or butter made from skim milk powder and anhydrous milk fat.

A food product of the invention may often be produced from two or more fractions of the invention, e.g. from a combined milk fraction. In this way a combined milk fraction with the desired composition and fat content may be prepared, and such a combined milk fraction may have a different content of phospholipid hydrolysis product than a similar combined milk fraction that is treated with phospholipase after separation into fractions and subsequent mixing into a combined fraction. By mixing fractions of the invention into combined milk fractions it is thus possible to obtain combined milk fractions with a range of compositions and with novel and improved properties.

In one embodiment of the invention a combined milk fraction is produced by mixing two or more milk fractions with differing fat content. A combined milk fraction may preferably have a different fat content than the milk composition from which the milk fractions were obtained. By mixing milk fractions in a desired ratio into a combined milk fraction, a combined milk fraction with a desired fat content may be obtained. In one embodiment of the invention a combined milk fraction is obtained by mixing two or more milk fractions of the invention with differing fat content in a ratio resulting in a combined milk fraction with a different fat content than the milk composition from which the fractions were obtained. A combined milk fraction may e.g. be produced by mixing skim milk and cream produced from phospholipase treated milk in desired amounts. In one embodiment of the invention a combined milk fraction comprises at least 0.5% (weight/weight) fat, such as at least 1% fat, or at least 1.5% fat. A combined milk fraction may be used for the production of a food product of the invention, e.g. a dairy product.

In a further embodiment of the invention a milk fraction obtained by the method of the invention is combined with a milk fraction obtained from a milk composition that has not been treated with a phospholipase to produce a combined milk fraction. In a still further embodiment of the invention a milk fraction is obtained from a milk composition that has not been treated with a phospholipase and the obtained milk fraction is then treated with a phospholipase to hydrolyse phospholipids, and the treated milk fraction is mixed with a milk fraction obtained by the method of the invention. Thus, in one embodiment the invention relates to: A method for producing a combined milk fraction, comprising: a) treating a first milk composition with a phospholipase; and b) separating the treated milk composition into at least two milk fractions; and c) separating a second milk composition into at least two fractions, and d) treating at least one milk fraction obtained from said second milk composition as a result of step c with a phospholipase; and e) combining at least one milk fraction obtained from said first milk composition as a result of step b) with at least one phospholipase treated milk fraction obtained as a result of step d). In a further embodiment cream is obtained from milk that has not been treated with a phospholipase, this cream is then treated with a phospholipase, and the phospholipase treated cream is mixed with skim milk obtained by the method of the invention. In this way a combined milk fraction can be produced with an increased level of lysophopsholipids, since phospholipids associated with the milk fat in the cream obtained from untreated milk is combined with lysophopsholipids present in the skim milk phase of milk that has been treated with a phospholipase before separation.

The invention also relates to food products obtained or obtainable by the methods of the invention.

Method for Producing Condensed Milk or Milk Powder

In one aspect the invention relates to a method for producing condensed milk or milk powder by treating a milk composition with a phospholipase and producing condensed milk or milk powder from the treated milk composition. Production of condensed milk and milk powder involves the removal of water by evaporation. Treatment of a milk composition with phospholipase may reduce the surface tension, and a reduced surface tension may reduce the degree of fouling observed e.g. during evaporation, which improves the economy of the process. Treatment of a milk composition with a phospholipase may be performed by any suitable method, e.g. as described elsewhere in this document, or as described in WO 00/54601 in relation to production of cheese. The phospholipase treatment may e.g. be performed by dispersing the phospholipase in the milk composition. The phospholipase treated milk composition may be heat treated to inactivate the phospholipase before the evaporating or drying step.

Condensed milk according to the invention may be produced from a phospholipase treated milk composition by any suitable method known in the art. Usually condensed milk is produced from milk that is standardised to the desired fat content and subjected to heat treatment, e.g. at 100-120° C. for 1-3 minutes. The milk is then usually subjected to evaporation, e.g in a falling film evaporator where water is removed under reduced pressure, e.g. at a temperature of 65-70° C., until the desired solids content has been achieved. The condensed milk may be homogenised to disperse the fat globules and prevent coagulation if the condensed milk is to be sterilised, homogenisation may e.g. be performed in a two-stage homogeniser at a pressure of e.g. 12-25 MPa. The condensed milk may be filled onto cans or any other suitable containers, and will usually be subjected to sterilisation, e.g. at 110-120° C. for 15-20 minutes. Alternatively the condensed milk may be subjected to UHT treatment before filling onto containers, e.g. at 140° C. for 3 seconds. For production of sweetened condensed milk sugar may be added at an appropriate step during the process, e.g. dry sugar may be added before heat treatment of the milk, or sugar syrup may be added during evaporation. Sugar will usually be added in an amount resulting in at least 62.5% sugar in the aqueous phase of the finished product. In order to control the crystallisation of lactose in sweetened condensed milk, it may be cooled rapidly under agitation after evaporation, and lactose crystals may be added as dry crystals or as a slurry when the milk has cooled to crystallisation temperature, usually around 30° C. Sweetened condensed milk does not need sterilisation because of the osmotic pressure caused by the added sugar.

Milk powders are usually produced from heat treated milk; additionally the milk may be subjected to e.g. bactofugation or microfiltration in order to decrease the bacterial count of the milk. Milk powder may be produced by roller drying of milk, wherein the milk is distributed in a thin layer on the surface of heated drums whereby water is evaporated. The dried layer may be scraped of by knifes and may be ground into flakes and/or grinded into powder. Alternatively, milk powder may e.g. be produced by spray drying. Before spray drying the milk is usually concentrated by evaporation to a dry matter content of e.g. 45-55%, e.g. in a falling film evaporator. The concentrated milk may them be pumped to a drying tower, wherein it is dispersed into very fine droplets which are mixed into a stream of hot air whereby the water is quickly evaporated. The dried milk particles are then separated from the hot air, e.g. in a cyclone. The process may also be performed as a two-stage process wherein the milk particles from the drying tower is subjected to further drying in a fluid bed dryer. Furthermore the process may be conducted as a three-stage process with two fluid bed drying steps, where the first fluid bed drying may be integrated in the drying tower. The drying equipment may be designed to produce a powder with the ability to be very quickly redissolved ("instant powder"). This effect may e.g. be achieved by rehumidifying the dried particles, either in the drying tower or in the fluid bed dryer, causing the particles to adhere and form agglomerates. Milk powder may be produced e.g. from skim milk, whole milk or butter milk. In one embodiment of the invention milk powder is skim milk powder. Milk powder produced by the method of the invention may e.g. be used in dairy plants that produce recombinant dairy products. Other examples of the utilisation of milk powders are e.g. in production of coffee whiteners and coffee creamers. The heat stability of the milk composition used for production of milk powders and of the milk powder is an important quality parameter. In one embodiment of the invention the heat stability of powders produced by the method of the invention is increased compared to milk powder produced by a conventional method.

The invention also relates to condensed milk and milk powder obtainable by the methods of the invention.

Method for Producing Butter or Dairy Spread

In one aspect the invention relates to a method for producing butter or dairy spread by treating a milk composition with a phospholipase and producing butter or dairy spread from the treated milk composition.

Local regulations may differ with regard to the definitions of butter, dairy spread and similar products. In the present context, butter is understood as a water-in-oil emulsion suitable for human consumption, wherein the fat phase is comprised of milk fat, and which additionally comprises non-fat milk solids, and is produced from cream. The fat content of butter is usually between 80% (weight/weight) and 95%, but may depend on local regulations, e.g. light butter or reduced fat butter may be produced e.g. with a fat content between 40% and 80% or even below 40%. Butter may be produced from sweet (non-acidified) cream or sour (acidified) cream. Butter may additionally comprise salt, and where regulations allow further additives such as e.g. emulsifiers and flavours. A dairy spread in the present context is understood as a water-in-oil emulsion suitable for human consumption, wherein the fat phase comprises milk fat and non-milk fat, and which may comprise additional milk and/or non-milk constituents. The fat content of a dairy spread usually varies between 35% (weight/weight) and 95%, but may even be below 35% for low fat dairy spreads. The non-milk fat component is usually vegetable fat, such as e.g. soybean oil or rapeseed oil. The ratio of milk fat to non-milk fat may be any ratio suitable to achieve the desired effect. If the desired effect is a butter-like product which is ready spreadable at refrigerator temperature usually between 15% and 40% of the fat is non-milk fat such as vegetable oil. A dairy spread may, depending on local regulations, comprise additional components such as e.g. salt, emulsifiers, stabilisers, and flavours.

Treatment of a milk composition with a phospholipase may be performed by any suitable method, e.g. as described elsewhere in this document, or as described in WO 00/54601 in relation to production of cheese. The phospholipase treatment may e.g. be performed by dispersing the phospholipase in the milk composition. In one embodiment of the invention cream is treated with a phospholipase before it is used for production of butter or dairy spread. The phospholipase treated milk composition may be heat treated to inactivate the phospholipase. In one embodiment of the invention a milk composition to be used for production of dairy spread is mixed with a composition comprising non-milk fat before treatment with a phospholipase.

Butter or dairy spread according to the invention may be produced by subjecting a phospholipase treated milk composition, e.g. cream, to any process known in the art suitable for producing butter or dairy spread. Cream to be used for production of butter or dairy spread is usually pasteurised to destroy unwanted microorganisms and/or enzymes, and may be acidified, e.g. by fermenting the cream with lactic acid bacteria.

Butter may e.g. be produced in a churn. A churn for butter production may e.g. be a cylindrical, conical, cubical or tetrahedral tank which can be rotated to agitate the cream to press fat out of milk fat globules to form free fat that coalesce into butter grains. The remaining liquid, the buttermilk, may be drained of and usually the butter is worked further in the churn to expel additional liquid and to distribute the remaining liquid evenly throughout the butter. The air pressure in the churn may be reduced during working to reduce the amount of air captured in the butter. Butter may also be produced in a continuous buttermaking machine. In a continuous buttermaking machine cream is transported continuously through several sections, e.g. a churning section, a separation section, a squeeze drying section and a working section. In the buttermaking machine the cream is churned to form butter grains, butter milk is separated off, and the butter is worked to distribute the liquid and expel air. If sweet cream is used as the raw material, lactic acid and/or a lactic bacteria starter culture may be mixed into the butter to impart acidity and flavour to the butter.

A dairy spread may e.g. be produced in a similar process as butter. In that case cream and non-milk fat, and additional ingredients, may be mixed before feeding to the butter production process.

Butter or dairy spreads may also be produced from cream concentrated to a milk fat content of e.g. 75-82% in a cream concentrator centrifuge. The concentrated cream may be mixed with e.g. water, salt and other additives and, if a dairy spread is to be produced, with non-milk fat, e.g. vegetable oil. The mixture may then be fed to scraped surface coolers where the emulsion is inversed to create a water-in-oil emulsion. The inverted emulsion may further be fed to pin kneading machines to be worked.

Enzymes to be Used in the Processes of the Invention:

Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipase A, which can further be classified as phospholipase $A_1$ (EC 3.1.1.32) or $A_2$ (EC 3.1.1.4.), which hydrolyze one fatty acyl group (in the sn-1 and sn-2 position, respectively) to form lysophospholipid. Phospholipase B (EC 3.1.1.5) hydrolyzes the remaining fatty acyl group in lysophospholipid. Other phospholipases are phospholipase C (EC 3.1.4.3) and phospholipase D (EC 3.1.4.4).

A phospholipase to be used in the method of the invention may be any phospholipase or any combination of phospholipases. In one embodiment the phospholipase to be used in the invention is a phospholipase A and/or a phospholipase B. The phospholipase activity may be provided by enzymes having other activities as well, such as e.g. a lipase with phospholipase activity. The phospholipase activity may e.g. be from a lipase with phospholipase side activity. In other embodiments of the invention the phospholipase enzyme activity is provided by an enzyme having essentially only phospholipase activity and wherein the phospholipase enzyme activity is not a side activity.

The phospholipase may be of any origin, e.g. of animal origin (such as, e.g. mammalian), e.g. from pancreas (e.g. bovine or porcine pancreas), or snake venom or bee venom. Alternatively, the phospholipase may be of microbial origin, e.g. from filamentous fungi, yeast or bacteria, such as the genus or species *Aspergillus*, e.g. *A. niger*; *Dictyostelium*, e.g. *D. discoideum*; *Mucor*, e.g. *M. javanicus, M. mucedo, M. subtilissimus*; *Neurospora*, e.g. *N. crassa*; *Rhizomucor*, e.g. *R. pusillus*; *Rhizopus*, e.g. *R. arrhizus, R. japonicus, R. stolonifer, Sclerotinia*, e.g. *S. libertiana*; *Trichophyton*, e.g. *T. rubrum*; *Whetzelinia*, e.g. *W. sclerotiorum*; *Bacillus*, e.g. *B. megaterium, B. subtilis*; *Citrobacter*, e.g. *C. freundii*; *Enterobacter*, e.g. *E. aerogenes, E. cloacae Edwardsiella, E. tarda*; *Erwinia*, e.g. *E. herbicola*; *Escherichia*, e.g. *E coli*; *Klebsiella*, e.g. *K. pneumoniae*; *Proteus*, e.g. *P. vulgaris*; *Providencia*, e.g. *P. stuartii*; *Salmonella*, e.g. *S. typhimurium*; *Serratia*, e.g. *S. liquefasciens, S. marcescens*; *Shigella*, e.g. *S. flexneri*; *Streptomyces*, e.g. *S. violeceoruber, Yersinia*, e.g. *Y. enterocolitica*. Thus, the phospholipase may be fungal, e.g. from the class Pyrenomycetes, such as the genus *Fusarium*, such as a strain of *F. culmorum, F. heterosporum, F. solani, F. venenatum*, or a strain of *F. oxysporum*. The phospholipase may also be from a filamentous fungus strain within the genus *Aspergillus*, such as a strain of *Aspergillus awamori, Aspergillus foetidus, Aspergillus japonicus, Aspergillus niger* or *Aspergillus oryzae*. A preferred phospholipase is derived from a strain of *Fusarium*, particularly *F. oxysporum*, e.g. from strain DSM 2672 as described in WO 98/26057, especially described in claim 36 and SEQ ID NO. 2 of WO 98/26057. In further embodiments, the phospholipase is a phospholipase as disclosed in WO 00/32758 (Novozymes A/S, Denmark).

Enzyme Sources and Formulation

The phospholipase used in the process of the invention may be derived or obtainable from any of the sources mentioned herein. The term "derived" means in this context that the enzyme may have been isolated from an organism where it is present natively, i.e. the identity of the amino acid sequence of the enzyme are identical to a native enzyme. The term "derived" also means that the enzymes may have been produced recombinantly in a host organism, the recombinant produced enzyme having either an identity identical to a native enzyme or having it a modified amino acid sequence, e.g. having one or more amino acids which are deleted, inserted and/or substituted, i.e. a recombinantly produced enzyme which is a mutant and/or a fragment of a native amino acid sequence. Within the meaning of a native enzyme are included natural variants. Furthermore, the term "derived" includes enzymes produced synthetically by e.g. peptide synthesis. The term "derived" also encompasses enzymes which have been modified e.g. by glycosylation, phosphorylation etc., whether in vivo or in vitro. The term "obtainable" in this context means that the enzyme has an amino acid sequence identical to a native enzyme. The term encompasses an enzyme that has been isolated from an organism where it is present natively, or one in which it has been expressed recombinantly in the same type of organism or another, or enzymes produced synthetically by e.g. peptide synthesis. With respect to recombinantly produced enzyme the terms "obtainable" and "derived" refers to the identity of the enzyme and not the identity of the host organism in which it is produced recombinantly.

Accordingly, the phospholipase may be obtained from a microorganism by use of any suitable technique. For instance, a phospholipase enzyme preparation may be obtained by fermentation of a suitable microorganism and subsequent isolation of a phospholipase from the resulting fermented broth or microorganism by methods known in the art. The phospholipase may also be obtained by use of recombinant DNA techniques. Such method normally comprises cultivation of a host cell transformed with a recombinant DNA vector comprising a DNA sequence encoding the phospholipase in question and the DNA sequence being operationally linked with an appropriate expression signal such that it is capable of expressing the phospholipase in a culture medium under conditions permitting the expression of the enzyme and recovering the enzyme from the culture. The DNA sequence may also be incorporated into the genome of the host cell. The DNA sequence may be of genomic, cDNA or synthetic origin or any combinations of these, and may be isolated or synthesized in accordance with methods known in the art.

Suitable phospholipases are available commercially. Examples are pancreas-derived phospholipase such as Lecitase® (manufactured by Novozymes A/S, Bagsvaerd, Denmark), and microbially derived phospholipase such as YieldMax® (Chr. Hansen A/S and Novozymes A/S, Denmark).

In the process of the invention the phospholipase may be purified. The term "purified" as used herein covers phospholipase enzyme protein free from components from the organism from which it is derived. The term "purified" also covers phospholipase enzyme protein free from components from the native organism from which it is obtained, this is also termed "essentially pure" phospholipase and may be particularly relevant for phospholipases which are naturally occurring and which have not been modified genetically, such as by deletion, substitution or insertion of one or more amino acid residues.

Accordingly, the phospholipase may be purified, viz. only minor amounts of other proteins being present. The expression "other proteins" relate in particular to other enzymes. The term "purified" as used herein also refers to removal of other components, particularly other proteins and most particularly other enzymes present in the cell of origin of the phospholipase. The phospholipase may be "substantially pure", i.e. free from other components from the organism in which it is produced, i.e., e.g., a host organism for recombinantly produced phospholipase. Preferably, the enzymes are at least 75% (w/w) pure, more preferably at least 80%, 85%, 90% or even at least 95% pure. In a still more preferred embodiment the phospholipase is an at least 98% pure enzyme protein preparation. In other embodiments the phospholipase is not naturally present in milk.

The terms "phospholipase" includes whatever auxiliary compounds that may be necessary for the catalytic activity of the enzyme, such as, e.g. an appropriate acceptor or cofactor, which may or may not be naturally present in the reaction system.

The phospholipase may be in any form suited for the use in question, such as e.g. in the form of a dry powder or granulate, a non-dusting granulate, a liquid, a stabilized liquid, or a protected enzyme. Granulates may be produced, e.g. as disclosed in U.S. Pat. Nos. 4,106,991 and 4,661,452, and may optionally be coated by methods known in the art. Liquid enzyme preparations may, for instance, be stabilized by adding stabilizers such as a sugar, a sugar alcohol or another polyol, lactic acid or another organic acid according to established methods. Protected enzymes may be prepared according to the method disclosed in EP 238,216.

Phospholipase Activity (LEU)

Phospholipase activity may be determined by the following method: Lecithin is hydrolyzed under constant pH and temperature, and the phospholipase activity (LEU) is determined as the rate of titrant (0.1N NaOH) consumption during neutralization of the liberated fatty acid by comparison to a known enzyme standard (available from Novozymes A/S, Bagsvaerd, Denmark). The substrate may be soy lecithin (L-alfa-Phosphotidyl-Choline) at a concentration of 20 g/1000 ml, and the conditions are pH 8.00, 40.0° C., reaction time 2 min.

EXAMPLE 1

Un-homogenized whole milk was used to produce three different samples of skim milk and two samples of cream by the following methods:

Sample 1.1

The milk was incubated at 40° C. for 30 minutes with a phospholipase from *Fusarium venenatum*. Enzyme dosage was 700 LEU/l milk. The enzyme reaction was terminated by heating the milk to 72° C. for 10 minutes. The milk was centrifuged at 3000 g for 20 minutes and separated in skim milk and cream.

Sample 1.2

The milk was held at 40° C. for 30 minutes without addition of phospholipase and heat treated at 72° C. for 10 minutes. The milk was centrifuged at 3000 g for 20 minutes and separated in skim milk and cream.

Sample 1.3

Skim milk from sample 1.2 was incubated at 40° C. for 30 minutes with a phospholipase from *Fusarium venenatum*. Enzyme dosage was 700 LEU/l milk. The enzyme reaction was terminated by heating the milk to 72° C. for 10 minutes Surface tension of the three skim milk samples using a tensiometer (Sigma 70, KSV Instruments Ltd., Finland) with the Wilhelmy plate technique. Measurement duration was one hour.

The following results were recorded for the surface tension (mN/m):

|  | Start | 15 min | 30 min | 45 min | 60 min |
| --- | --- | --- | --- | --- | --- |
| Skim milk from sample 1.1 | 33.5 | 33.2 | 33.1 | 33.1 | 32.9 |
| Skim milk from sample 1.2 | 42.4 | 41.6 | 40.5 | 40.0 | 39.6 |
| Skim milk from sample 1.3 | 35.2 | 34.6 | 34.5 | 34.4 | 34.3 |

EXAMPLE 2

The two cream fractions obtained from sample 1.1 and sample 1.2 of experiment 1 were used for churning of butter in a Kitchen Aid whipping machine operated at maximum speed. 250 g cream was cooled to 5° C. before churning and the whipping/churning was performed at room temperature.

The butter and buttermilk was separated using a sieve and the amount of butter was measured by weighing. The cream separated from the enzyme treated whole milk of sample 1.1 gave a butter yield of 34.76% of the cream, whereas the cream from the untreated milk of sample 1.2 resulted in 33.32%.

EXAMPLE 3

The two skim milk fractions from the sample 1.1 and sample 1.2 of example 1 were used for production of acidified milk. 9 parts skim milk was incubated with 1 part commercial acidified buttermilk and incubated for 20 hours at room temperature. The incubation was made directly in the device used for viscosity measurements (Rapid Visco Analyzer RVA-4. Newport Scientific, Australia). This consists of a measure cylinder mounted with a spindle. Five sample of each treatment were prepared. The spindle was rotated at 100 rpm and the viscosity was recorded continuously during 15 minutes of rotation. The average viscosity was 362 cp (centipoise) for the enzyme treated acidified skim milk from sample 1.1 and 406 cp for the acidified skim milk not treated with enzyme from sample 1.2.

EXAMPLE 4

Un-homogenized whole milk was used to produce two different samples of skim milk by the following methods:
Sample 4.1
The milk was incubated at 40° C. for 30 minutes with a phospholipase from *Fusarium venenatum*. Enzyme dosage was 350 LEU/l milk. The enzyme reaction was terminated by heating the milk to 72° C. for 10 minutes. The milk was centrifuged at 3000 g for 20 minutes and separated in skim milk and cream.
Sample 4.2
The milk was held at 40° C. for 30 minutes without addition of phospholipase and heat treated at 72° C. for 10 minutes. The milk was centrifuged at 3000 g for 20 minutes and separated in skim milk and cream.
Content of phospholipids phosphatidyl choline (PC) and phosphatidyl ethanolamine (PE) in the whole milk samples and skim milk samples from 4.1 and 4.2 was analyzed by HPLC.
The following results were recorded for the content of PC and PE (µg):

|  | PC | PE |
|---|---|---|
| 4.1 raw milk - enzyme treated | 0.47 | Below detection limit |
| 4.1 skim milk - enzyme treated | 0.20 | Below detection limit |
| 4.2 raw milk - no enzyme | 6.42 | 6.33 |
| 4.2 skim milk - no enzyme | 6.05 | 5.12 |

EXAMPLE 5

Replacement of Beta-Lactoglobulin From Air-Water Interface by Hydrolyzed Milk Phospholipids Method: Surface Tension and Elasticity in Dilation
The surface dilatational elasticity and surface tension were determined by the method of Kokelaar et al. (Kokelaar, J. J., Prins, A. and De Gee, M., *J. Colloid Interface Sci.*, 1991, 146, 507). The technique involves a periodical expansion and compression of the surface resulting from raising and lowering of a 10 cm diameter ground glass ring into a vessel containing 200-250 ml of sample solution. The change in surface tension resulting from the induced surface area change was used to calculate the surface dilatational modulus [E] (surface elasticity). The change in area was kept at maximum 5% in order to prevent disruption of the surface layer.
beta-lactoglobulin solution was poured into the sample vessel and the measurement was started immediately after dipping the grounded glass Wilhelmy plate into the sample. Adsorption of protein to the air-water interface was monitored by following the decrease of surface tension and increase of surface elasticity. After 45 minutes, when the surface elasticity was close to a plateau, and 4 ml of phospholipid sample was injected to the solution under the liquid surface, outside the ring. The development of surface tension and [E] were monitored for 155 minutes after the addition. Two or three replicas of each phospholipid preparation were measured.
Sample Preparation
The used milk phospholipid preparations were:
1) purified native milk phospholipid mixture (MPLC),
2) MPLC hydrolyzed by a phospholipase (YieldMax®, Chr. Hansen A/S and Novozymes A/S, Denmark; 60 LEU/mg phospholipid)
3) milk phospholipid concentrate hydrolyzed by pancreatic phospholipase (Lecitase 10 L, Novozymes A/S, Bagsvaerd, Denmark) and subsequently purified by preparative chromatography.

The start material in all cases was a commercial milk phospholipid concentrate PSNU18200, from Arla Foods, Nr Vium, Denmark. The phospholipid composition of the preparations is presented in Table 1.
The samples were dispersed in 20 mM imidazol, 6.5 mM $CaCl_2$, pH 7.0 and sonicated by a probe sonicator in order to achieve a fine dispersion.
Beta-lactoglobulin genetic variant B was purified as described by Kristiansen et al. (Kristiansen, K. R, Otte, J., Ipsen, R. and Qvist, K., *Int Dairy J.*, 1998, 8, 113-118). A stock solution of 2 mg/ml beta-lactoglobulin was prepared in 20 mM imidazol, 6.5 mM $CaCl_2$, pH 7.0. The precise concentration was calculated based on absorbance at 280 nm, using an absorptivity of 0.96 $mlmg^{-1}cm^{-1}$. The stock was diluted in the same buffer to 10 micromolar concentration immediately before starting the measurement.

TABLE 1

Phospholipid content (µg/g) in the bulk subphase during replacement experiment.

| Sample | PC | PE | LPC | LPE | SPH | Total |
|---|---|---|---|---|---|---|
| Native MPLC | 8.6 | 9.0 | 0 | 0 | 14.3 | 32 |
| Hydrolyzed MPLC | 1.7* | 1.8* | 4.6* | 4.8* | 14.3 | 27*/32** |
| Purified hydrolysate | <1.5 | 0 | 4.0 | 5.9 | 8.1 | 18.5 |

*Estimated based on expected 80% hydrolysis of PC and PE.
**Content before hydrolysis: On weight basis, the amount is reduced during hydrolysis as fatty acid is released.
PC: Phosphatidylcholine; PE: Phosphatidylethanolamine; LPC: Lyso-phosphatidylcholine; LPE: Lyso-phosphatidylethanolamine; SPH: Sphingomyelin Results
Injection of hydrolyzed MPLC or purified hydrolysate in the bulk under the beta-lactoglobulin surface film caused a sudden drop of surface elasticity [E] from approx. 90 mN/m to <50 mN/m. The abolishment of surface elasticity indicates rupture of the beta-lactoglobulin surface film and removal of protein from the surface. Simultaneously, the surface tension was decreased to lower values than those typical for beta-lactoglobulin. The results show that beta-lactoglobulin was replaced by more surface active compounds. Native milk phospholipid mixture did not cause replacement of protein from the air-water interface (surface elasticity and surface tension did not change substantially upon addition), so clearly the hydrolysis products are essential for the removal of the protein layer.
The results show the ability of hydrolysis products of milk phospholipids to replace whey protein at interfaces.

EXAMPLE 6

Butter From Phospholipase Treated Cream

Cream (38% fat) was heated to 19° C. and treated with a phospholipase (YieldMax®, Chr. Hansen A/S and Novozymes A/S, Denmark; Dosage 1750 LEU/l cream) for 2 hours. After enzyme treatment 100 g cream was whipped in a whipping/churning equipment (Slagsahne Geprüfgerät, JAN2 Labortecnik, D-2427 Malente/Holst, Germany). Control samples of cream not treated with phospholipase were whipped using the same procedure. Whipping was continued for 30 seconds after churning occurred (measured as maximum energy consumption). The amount of butter produced was weighed after dripping off the buttermilk. Butter yield of control samples was 50.30% (average of 4 samples tested), and butter yield of enzyme treated samples was 54.18%.

Surface tension of cream after enzyme treatment was 31.6 mN/m compared to control sample 33.8 mN/m.

EXAMPLE 7

Milk Powder From Phospholipase Treated Milk 100 l milk (3.5% fat) was heated in a tank to 40° C. and phospholipase was added at dosage 175 LEU/l milk (1.84 g enzyme/100 l milk). The phospholipase was from *Fusarium venenatum* with activity of 9500 LEU/g.

After 30 minutes treatment the milk was flash pasteurized to inactivate the enzyme at 80° C.

The milk was evaporated to 40% dry solids in a one-step falling film evaporator, and spray dried with inlet air temperature of 180° C. and outlet air temperature of 82° C.

A control sample batch was treated the same way only omitting the enzyme addition.

Milk powder samples were analysed for solubility index, free fat, and surface tension. Solubility index was measured as the amount of sediment in ml after two centrifugations of 13 g reconstituted milk powder in 100 ml water at room temperature. The milk powder was added water and mixed in a blender with 3500 rpm. Of the solution 50 ml was centrifuged in 5 minutes, the supernatant removed and the sediment suspended in 25 ml water, and centrifuged. The amount (ml) after the second centrifugation was given as solubility index.

Free fat is the amount of fat that was extracted by $CCl_4$ in percentage of total fat content.

Surface tension is measured with the Wilhelmy plate method using a tensiometer. (Krüss Tensiometer K10, Krüss GmbH, Hamburg, Germany)

The following results were found:

|  | Control sample | Enzyme treated |
| --- | --- | --- |
| Solubility index (ml) | 0.3 | 0.1 |
| Free fat (% of total fat) | 3.52 | 2.53 |
| Surface tension (mN/m after 60 min) | 41.8 | 38.7 |

Solubility index was lowered by enzyme treatment, which indicates a better heat stability of the milk protein. A better emulsion stability of the fat is found as the free fat is lowered. The decrease of surface tension is indicating less tendency of fouling of dairy equipment.

The invention claimed is:

1. A method for producing a combined milk fraction comprising:
   i) treating a milk composition with a phospholipase; and
   ii) separating the treated milk composition into at least two fractions with different fat content, mixing two or more fractions obtained in step ii), wherein the combined milk fraction has a different fat content than the milk composition from which the two or more milk fractions were obtained.

2. A method for producing a combined milk fraction, comprising:
   a) treating a first milk composition with a phospholipase; and
   b) separating the treated milk composition into at least two milk fractions with different fat content; and
   c) separating a second milk composition into at least two fractions; and
   d) treating at least one milk fraction obtained from said second milk composition as a result of step c with a phospholipase; and
   e) combining at least one milk fraction obtained from said first milk composition as a result of step b) with at least one phospholipase treated milk fraction obtained as a result of step d).

3. A combined milk fraction obtainable by the method of claim 1.

4. The method of claim 1 further comprising producing a food product from the combined milk fraction obtained.

5. The method of claim 4 wherein the food product is cheese, milk powder, condensed milk, dulche de leche, butter, ghee, buttermilk, cream, skim milk, or a fermented milk product.

6. A combined milk fraction obtainable by the method of claim 2.

* * * * *